T. H. KRUSE.
AUTOMOBILE ATTACHMENT.
APPLICATION FILED NOV. 1, 1915.
1,247,691. Patented Nov. 27, 1917.
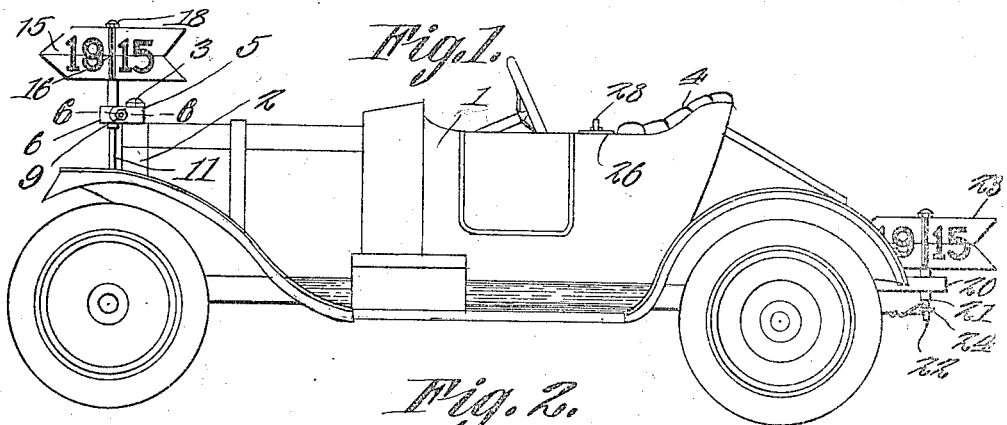
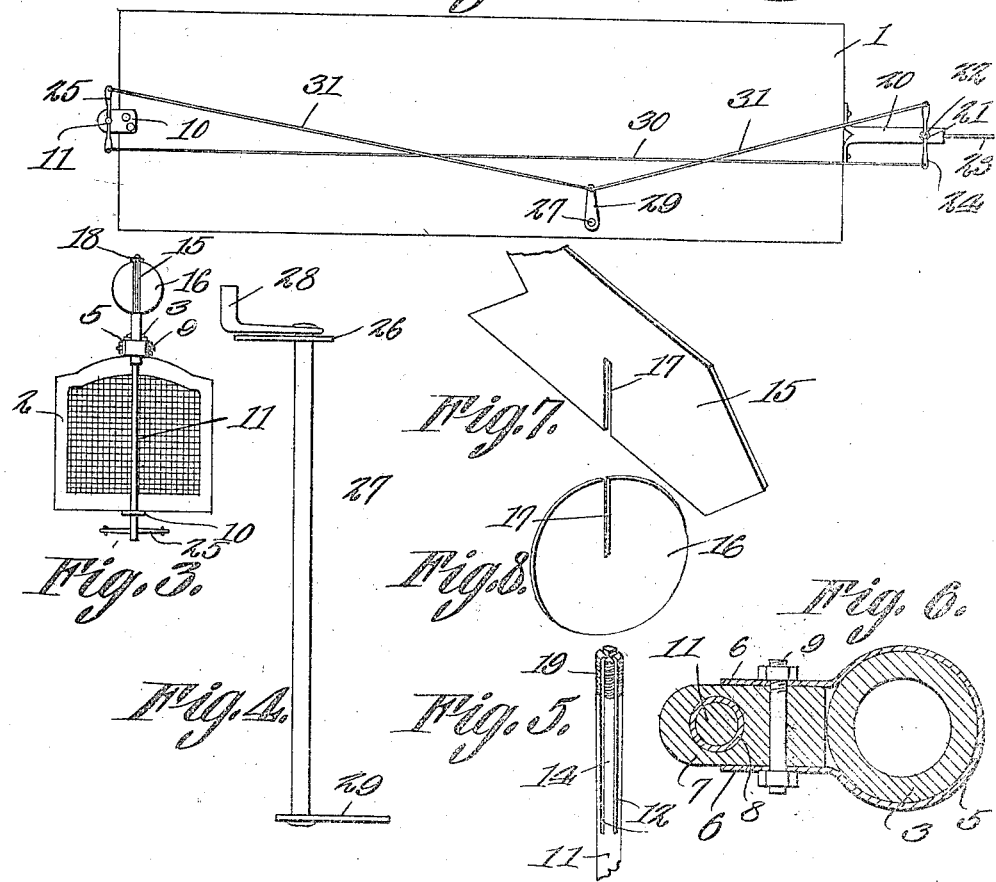
Witnesses
T. H. Kruse, Inventor,
by ———— Attorneys.

UNITED STATES PATENT OFFICE.

THEODORE H. KRUSE, OF ARVADA, COLORADO.

AUTOMOBILE ATTACHMENT.

1,247,691.  Specification of Letters Patent.  Patented Nov. 27, 1917.

Application filed November 1, 1915. Serial No. 59,125.

*To all whom it may concern:*

Be it known that I, THEODORE H. KRUSE, a citizen of the United States, residing at Arvada, in the county of Jefferson and State of Colorado, have invented a new and useful Automobile Attachment, of which the following is a specification.

The device forming the subject matter of this application is adapted to be applied to an automobile, for the purpose of indicating in which direction the vehicle is to be turned.

The invention aims to provide a pair of signals at the opposite ends of an automobile, combined with novel means for actuating both of the signals at once, whereby the signals will point in the same direction toward one side of the machine or the other.

The invention aims to improve the construction of the signals, to provide novel means for actuating the signals, and to provide novel means whereby the device forming the subject matter of this application may be assembled readily with a motor propelled vehicle without working serious or extensive changes therein.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a motor propelled vehicle equipped with the device forming the subject matter of this application;

Fig. 2 is a diagrammatic bottom plan illustrating the means whereby the signals are actuated simultaneously;

Fig. 3 is a fragmental front elevation showing the means whereby the forward signal operating shaft is mounted;

Fig. 4 is an elevation showing the shaft under the control of an operator, for manipulating the signals;

Fig. 5 is a fragmental perspective showing one of the signal shafts;

Fig. 6 is a cross section taken approximately on the line 6—6 of Fig. 1;

Figs. 7 and 8 are perspective views, delineating the constituent members of the signal, the signal element in Fig. 7 being partly broken away.

In the accompanying drawings, the numeral 1 indicates the body of an automobile, the radiator being shown at 2, the same being provided with a filling nipple 3 as is usual. The automobile 1 is shown, for the sake of economizing space in the drawings, as being provided with one seat, but it is obvious that this detail is of no importance.

A resilient clamp 5 embraces the filling nipple 3 closely and terminates in arms 6 between which is located a block 7 to which is rigidly held a vertical bearing sleeve 8, preferably fashioned from metal. A tightening means such as a bolt 9 passes through the arms 6 and through the block 7 and serves to hold the latter in place together with the sleeve 8. Secured to the bottom of the body 1 of the automobile at the forward end thereof is a bearing 10. Journaled for rotation in the bearing 10 and in the bearing sleeve 8 is a shaft 11 which is threaded at its upper end as shown at 19. The shaft 19 is equipped adjacent its upper end with a plurality of vertical slits 12, defining yieldable fingers 14.

A signal is assembled with the shaft 11, the signal comprising an arrow 15 and a disk 16, the arrow and the disk being slotted in their edges as shown at 17, so that the arrow and the disk may be interlocked and be disposed at right angles to each other. When the arrow 15 and the disk 1 are placed together, the signal thus formed is pushed downwardly into the slits 12 of the shaft 11, between the fingers 14. A nut 18 is mounted on the threaded portion 19 of the shaft and bears against the upper edges of the arrow 15 and the disk 16, to hold these elements firmly in place, and in abutment with the shaft 11 at the lower ends of the slits 12. The lower edges of the arrow 15 and the disk 16 rest on the upper end of the bearing sleeve 8 in the block 7 and thus the shaft 12 is prevented from moving downwardly beyond a predetermined point.

Attached to the rear end of the body 1 and projecting therefrom is a bracket 20 carrying a sleeve 21 resembling the sleeve 8. Journaled in the sleeve 21 is a shaft 22 carrying a signal 23, the shaft and the signal being constructed, respectively, like the shaft 11 and the signal 15—16. The arrow portions of the signal may be lettered to convey any desired information, the disks 16 preferably being painted red or some other distinguishing and prominent color.

Secured to the lower end of the shaft 22 is a transverse arm 24, a transverse arm 25 being secured to the lower end of the shaft 11. Attached to the upper edge of the body 1 of the vehicle, in accessible relation to the seat 4 is a plate 26. Journaled for rotation in the plate 26 and extending downwardly between the constituent parts of the side walls of the body 1 of the automobile is a shaft 27 provided at its upper end with a handle 28, and equipped at its lower end with an arm 29. A flexible element 30 connects the corresponding ends of the arms 25 and a flexible element 31 connects the opposite, corresponding ends of the arms. The flexible element 31 is extended across the flexible element 30, the intermediate portion of the flexible element 31 being attached to the end of the arm 29 which is operated by the shaft 27.

In practical operation, rotation may be imparted to the shaft 27 by means of the handle 28 whereupon the arm 29 will actuate the flexible elements 31 and 30 and, through the medium of the arms 24 and 25, operate the shafts 22 and 11, and the signals carried thereby, the construction being such that both of the arrows 15 will point simultaneously in a common direction, toward one side of the vehicle, and indicate the direction in which the vehicle is to be turned.

Having thus described the invention, what is claimed is:—

In a device of the class described, a vehicle body; a signal shaft journaled on the forward end of the body; a signal shaft journaled on the rear end of the body; an actuating shaft journaled on the body intermediate the ends of the body; a crank arm on the actuating shaft; arms carried by the signal shafts; a flexible element connecting the arms of the signal shafts on one side of the signal shafts; and a second flexible element extended between the arms of the signal shafts on the other side of the signal shafts, the second flexible element being extended across the first specified flexible element at two points, and being connected, intermediate its ends, to the crank arm of the actuating shaft.

In testimony that I claim the foregoing as my own, I have hereto affixed my signature in the presence of two witnesses.

THEODORE H. KRUSE.

Witnesses:
   WILLIAM W. MABERLY,
   HENRY J. JUCHEM.